April 22, 1930. A. L. JONES Re. 17,647

DISAPPEARING BED

Original Filed Aug. 7, 1925 2 Sheets-Sheet 1

INVENTOR.
Abraham L. Jones.
BY
Townsend, Loftus & Abbott
ATTORNEYS.

April 22, 1930. A. L. JONES Re. 17,647

DISAPPEARING BED

Original Filed Aug. 7, 1925 2 Sheets-Sheet 2

INVENTOR.
Abraham L. Jones.
BY
Townsend, Lofton & Abbott
ATTORNEYS.

Reissued Apr. 22, 1930 Re. 17,647

UNITED STATES PATENT OFFICE

ABRAHAM L. JONES, OF LOGANSPORT, INDIANA

DISAPPEARING BED

Original No. 1,595,944, dated August 10, 1926, Serial No. 48,772, filed August 7, 1925. Application for reissue filed October 5, 1927. Serial No. 224,246.

This invention relates to disappearing beds, and is particularly concerned with a type of wall or closet bed wherein the recess or closet has an opening of a width to be closed by a standard size door, that is about two and one-half feet, said door being fitted with a wide bed which is about four feet in width, the said bed being arranged so as to extend past one edge of the door by a matter of some eighteen inches. In prior structures of this type the door is usually arranged in the ordinary manner, and therefore when the bed is out of the closet and disposed in the sleeping room the closet opening cannot be closed.

It is the principal object of this invention to so mount a narrow door of this character that it may carry a wide bed in and out of a closet or recess through a narrow opening, and at the same time effect a closure of the opening in either position of the door, that is, the opening will be completely closed by one and the same door both when the bed is stored in the closet and when it is exposed for use in the sleeping room.

One form which my invention may assume is exemplified in the following description and illustrated in the accompanying drawings, wherein.

Figure 1:
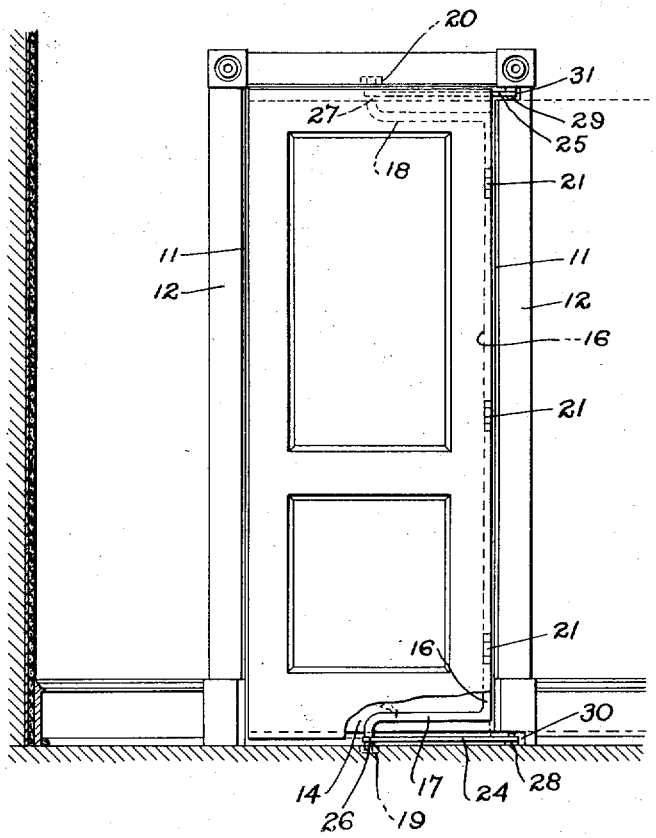
Figure 1 is an elevation, partly in section, of a part of the wall of a room with a door and its casing leading to a closet or recess in which the bed is supported from the door when not in use.

The improved bed supporting devices may be associated with a suitable closure or cabinet, or with a closet or recess formed in the wall of a room, and including a closure or door, but for the purpose of illustration is shown associated with a closet or recess represented conventionally at 10 and having a doorway opening defined by a frame 11 and casings 12, and with a door, represented at 13, within the opening.

The bed is indicated conventionally at 14, of any suitable construction. The supporting frame of the bed 14 is rigidly connected to one side of the door 13 by bracket devices, indicated at 15. The bed being somewhat wider than the door it is arranged thereon so as to overhang one edge a considerable distance.

A U-shaped or yoke-like support is formed of a main vertical portion 16 and lateral or arm portions 17 and 18, the portion 17 pivoted at 19 in the floor of the closet between the door frames, and the portion 18 pivoted at 20 in the head or lintel of the door frame. The links 17 and 18 are pivotally mounted at one end on the central vertical transverse plane of the doorway and to one side of the central longitudinal vertical plane of the doorway.

Figure 4:
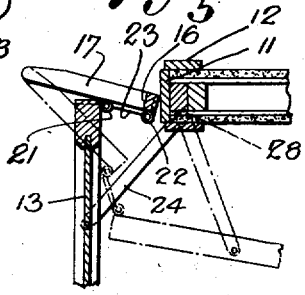
Figure 4 shows a sectional detail view in plan, illustrating intermediate positions of the door.

The door 13 is provided with hinge members 21, while the vertical portion 16 of the support is provided with like hinge members, one of which is shown at 22, and connecting each pair of the hinge members is a leaf or strap 23, the three portions 21, 22 and 23 constituting a double hinge device as illustrated more clearly in Figure 4.

Radius bars 24 and 25 are pivoted respectively at one end as at 26 and 27 to the upper and lower ends of the door 13, and pivoted at 28 and 29 at the other ends in recesses 30 and 31 in the frame structure of the doorway.

Figure 2:
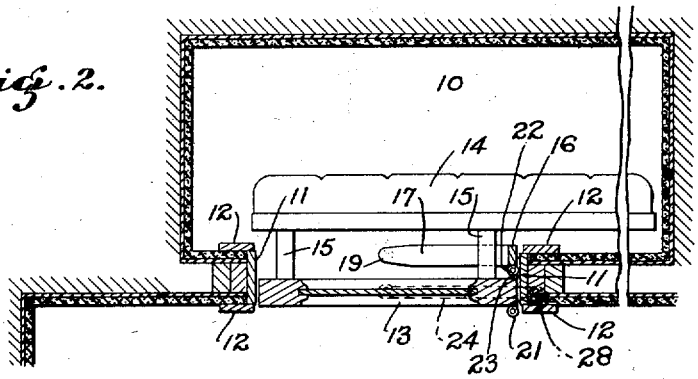
Figure 2 is a transverse section of the recess or closet and the door for closing the same together with the bed and its supports and hanger when in closed or withdrawn position.
Figure 3:
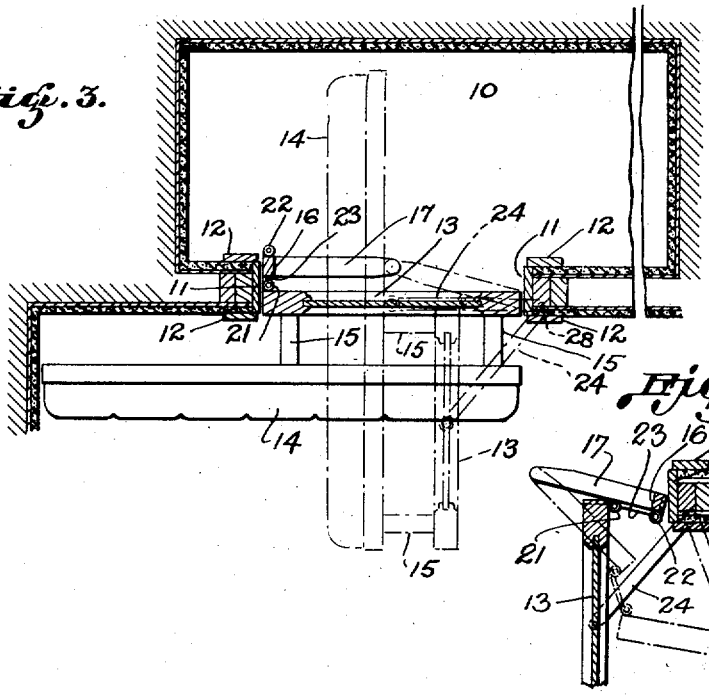
Figure 3 is a similar view with the bed in its outer position prior to being turned down into operative position.

As shown in Figures 1 and 2 the bed is entirely concealed in the closet with the door 13 closed and presenting one face outwardly, and as shown in Figure 3, the bed is shown within the room and outside of the closet and with the opposite face of the door presented outwardly.

When the bed is to be withdrawn it is only necessary to swing the door outwardly or into open position when the support 16, 17, 18 and the radius bars 24 and 25 will cause the bed to be turned into the position shown in Figure 3, and the door closed and with the opposite face outwardly.

One intermediate position of various parts during the operation is indicated by dotted lines in Figure 3.

The same intermediate position of the door is shown in full lines in Fig. 4, and in dotted lines in said view is shown another intermediate position. It will be noted from these views that in opening the door from the position shown in Fig. 2, the first movement of the door will bring it into position at right angles to the doorway, as shown in full lines in Fig. 4. Further turning movement of the door will carry it bodily forwardly until it is spaced away from both jambs, but further from the jamb on that side of the door which carries the bed. In this extreme forward position the links 17 and 23 will be straightened out, and thereafter the door can be shifted rearwardly and to the left, into the closed position shown in full lines in Fig. 3.

The system of supports and hangers permits the required movements and reversal of the door so that the latter can be disposed in the doorway opening and thus close the entrance to the cabinet or closet at all times.

The improved device is simple in construction, can be inexpensively and strongly constructed, and of any size, either for a single or double bed, as may be required.

What is claimed and desired to be secured by Letters Patent is:

1. In a disappearing bed, the combination with a reversible door, of a door frame, a bed attached to the said door, the said bed being wider than the door and frame and projecting beyond one side of the door, a U-shaped door carrying member having a vertically disposed portion normally arranged adjacent to one edge of the door and movable with the door, double hinge devices connecting the said vertical portion of said member and the adjacent edge of the door, the said U-shaped member being constructed with lateral portions having their ends pivotally connected with the floor and door frame, said pivotal points having fixed positions, and radius bars located at the top and bottom of the door, each radius bar having one end pivotally attached to the door and midway between the sides of the door and movable with the door, and the other end pivotally connected with the frame structure of the door.

2. In a disappearing bed, the combination with a reversible door, of a door frame, a bed attached to the said door, the said bed being wider than the door and frame and projecting beyond one side of the door, door-carrying means having portions at the top and bottom of the door normally arranged adjacent to one edge of the door, double hinge devices connecting the said vertical portions and the adjacent edge of the door and movable with the door, the said door-carrying means having lateral portions arranged with ends pivotally connected with the floor and said door frame, the said pivotal points having fixed positions, and radius bars located at the top and bottom of the door, each radius bar having one end pivotally attached to the door midway between the sides of the door and movable with the door, and the other end pivotally connected with the frame structure of the door.

3. In a combination with a bed container including a wall having a door opening therein, a pair of links pivotally secured at their inner ends in the vertical central transverse plane of said opening and at one side of the central longitudinal vertical plane of the latter, said links being of a length for the free ends thereof to reach substantially the adjacent lateral edges of said opening, a single door pivotally secured at one edge to the free ends of said links, a bed wider than said opening and carried by said door, and means whereby said door will be guided to completely close said opening when the bed is completely stored in said container or positioned for use.

4. In combination with a bed container including a wall having a door opening therein, a yoke member arranged vertically in said opening with the arms of the yoke member pivotally secured in the vertical central transverse plane of said opening and to one side of the central longitudinal vertical plane of the latter, the said arms being of a length to dispose the bight portion of the yoke adjacent to the lateral edges of the said opening when in its extreme positions of movement, a single door pivotally secured at one edge to the bight portion of said yoke member, a bed wider than said opening and carried by said door, and means whereby said door will be guided to completely close said opening when the bed is completely stored in said container or positioned for use.

5. In combination with a bed container including a wall having a door opening therein, a single reversible door swingingly mounted adjacent said opening, a bed wider than said opening and carried by said door, a linkage having one end pivotally mounted at one side of the central longitudinal vertical plane of said opening and in the vertical central transverse plane thereof, the other end of said linkage being connected to the door adjacent one edge of the latter for swingingly and hingedly mounting the same, and means whereby said door will be guided to completely close said opening when the bed is completely stored in said container or positioned for use.

6. The combination with a door and a doorway, of hinges at one side of the door and a swinging support for said hinges, said swinging support having its pivotal points mounted approximately within the plane of the doorway and being capable of turning through an arc of substantially 180°, whereby the door may be opened at right angles to the doorway and adjacent one side thereof, so as to uncover substantially the entire opening, and then closed in reversed position by reversing the position of the swinging support, and means pivotally connected to the door and the frame of the doorway and having a movement co-ordinated with that of the swinging support to cause the door to move through a fixed and definite path during the reversing movement of the swinging support.

ABRAHAM L. JONES.